(12) United States Patent
Palama

(10) Patent No.: US 9,018,310 B2
(45) Date of Patent: Apr. 28, 2015

(54) POLYMER BLEND COMPOSITION FOR AUTOMOTIVE FLOORING APPLICATIONS

(75) Inventor: Michael J. Palama, Manitowoc, WI (US)

(73) Assignee: Polyone Designed Structures and Solutions LLC, Avon Lake, OH (US)

( * ) Notice: Subject to any disclaimer, the term of this patent is extended or adjusted under 35 U.S.C. 154(b) by 205 days.

(21) Appl. No.: 12/418,962

(22) Filed: Apr. 6, 2009

(65) Prior Publication Data

US 2010/0256281 A1    Oct. 7, 2010

(51) Int. Cl.
| | | |
|---|---|---|
| C08L 23/06 | (2006.01) | |
| C08L 23/16 | (2006.01) | |
| C08L 23/10 | (2006.01) | |
| B29C 47/00 | (2006.01) | |
| B29C 51/00 | (2006.01) | |
| B29L 31/30 | (2006.01) | |
| B29L 31/00 | (2006.01) | |

(52) U.S. Cl.
CPC ............ C08L 23/10 (2013.01); B29C 47/00 (2013.01); B29C 47/0019 (2013.01); B29C 51/00 (2013.01); B29L 2031/30 (2013.01); B29L 2031/732 (2013.01); C08L 23/06 (2013.01); C08L 23/16 (2013.01); C08L 2205/03 (2013.01)

(58) Field of Classification Search
CPC .................. B29L 2031/7324; C08L 23/16
USPC ........ 525/240, 232–236; 526/352.2; 524/423, 524/425
See application file for complete search history.

(56) References Cited

U.S. PATENT DOCUMENTS

| | | | |
|---|---|---|---|
| 3,256,367 A | | 6/1966 | Jayne, Jr. |
| 3,846,349 A | | 11/1974 | Harada et al. |
| 3,919,358 A | * | 11/1975 | Batiuk et al. ................. 525/211 |
| 3,957,919 A | * | 5/1976 | Von Bodungen et al. .... 524/504 |
| 4,087,485 A | | 5/1978 | Huff |
| 4,088,714 A | * | 5/1978 | Huff .............................. 525/193 |
| 4,113,802 A | * | 9/1978 | Matteoli et al. ............... 525/270 |
| 4,128,523 A | * | 12/1978 | Britton et al. ................. 524/525 |
| RE30,405 E | * | 9/1980 | Fischer ......................... 525/240 |
| 4,434,264 A | | 2/1984 | Ficker |
| 4,621,119 A | * | 11/1986 | Lu ................................. 525/240 |
| 4,632,861 A | | 12/1986 | Vassilatos |
| 4,634,735 A | * | 1/1987 | Thiersault et al. .............. 525/88 |
| 4,634,739 A | | 1/1987 | Vassilatos |
| 4,770,837 A | * | 9/1988 | Lu et al. ......................... 264/503 |
| 4,774,292 A | | 9/1988 | Thiersault et al. |
| 4,839,228 A | | 6/1989 | Jezic et al. |
| 4,874,666 A | | 10/1989 | Kubo et al. |
| 5,133,917 A | | 7/1992 | Jezic et al. |
| 5,147,936 A | | 9/1992 | Peszkin et al. |
| 5,194,457 A | * | 3/1993 | Brichta et al. ................. 523/200 |
| 5,266,392 A | | 11/1993 | Land et al. |
| 5,316,861 A | * | 5/1994 | Marchal et al. ............... 428/516 |
| 5,358,792 A | | 10/1994 | Mehta et al. |
| 5,414,032 A | | 5/1995 | Akao |
| 5,439,628 A | * | 8/1995 | Huang .......................... 264/175 |
| 5,468,809 A | * | 11/1995 | Ghisellini et al. ............. 525/240 |
| 5,576,374 A | | 11/1996 | Betso et al. |
| 5,856,406 A | | 1/1999 | Silvis et al. |
| 5,861,463 A | * | 1/1999 | Sehanobish et al. .......... 525/240 |
| 5,898,050 A | | 4/1999 | Shih et al. |
| 6,096,831 A | | 8/2000 | Nagaoka et al. |
| 6,225,412 B1 | | 5/2001 | Chaffin et al. |
| 6,407,171 B1 | | 6/2002 | Agarwal et al. |
| 6,407,172 B1 | * | 6/2002 | Hausmann ..................... 525/191 |
| 6,472,081 B1 | * | 10/2002 | Tsai et al. ....................... 428/457 |
| 6,498,214 B2 | | 12/2002 | Laughner et al. |
| 6,531,520 B1 | | 3/2003 | Bambara et al. |
| 6,555,588 B2 | | 4/2003 | Gorski et al. |
| 6,569,945 B2 | | 5/2003 | Bugada et al. |
| 6,593,386 B1 | * | 7/2003 | Malwitz et al. ................ 521/134 |
| 6,734,253 B2 | | 5/2004 | Krabbenborg et al. |
| 6,784,252 B2 | | 8/2004 | Ramanathan et al. |
| 6,812,286 B2 | | 11/2004 | Schardl, Jr. et al. |
| 6,828,384 B2 | | 12/2004 | Kakarala et al. |
| 6,838,523 B2 | | 1/2005 | Williams et al. |
| 7,125,924 B2 | * | 10/2006 | Credali et al. ................. 524/425 |
| 7,125,933 B2 | | 10/2006 | German et al. |
| 7,220,801 B2 | | 5/2007 | Dunaway |
| 7,411,017 B2 | * | 8/2008 | Imai ............................... 524/525 |
| 2001/0010411 A1 | | 8/2001 | Somers |
| 2001/0018465 A1 | | 8/2001 | Yano et al. |
| 2001/0051267 A1 | | 12/2001 | Maugans et al. |
| 2001/0053831 A1 | | 12/2001 | Ohno et al. |
| 2002/0019490 A1 | | 2/2002 | Maugans et al. |
| 2002/0061976 A1 | * | 5/2002 | Krabbenborg et al. ....... 525/240 |
| 2002/0107328 A1 | | 8/2002 | Laughner et al. |
| 2002/0128394 A1 | | 9/2002 | Gorski et al. |

(Continued)

FOREIGN PATENT DOCUMENTS

| | | | |
|---|---|---|---|
| DE | 19915314 | A1 * | 10/2000 |
| JP | 06248126 | A * | 9/1994 |

OTHER PUBLICATIONS

Ullmann's Encyclopedia of Industrial Chemistry: Polyolefins, 2000.*
Machine translated English equivalent of JP 06-248126 (Sep. 1994, 9 pages).*
LyondellBasell Polymers (Product Data and Technical Information: Hifax CA 10 A, 2007, 1 page).*
Machine translated English equivalent of DE 199 15 314 (Oct. 2000, 5 pages).*
Human translation of DE 19915314 (Oct. 2000, 19 pages).*

*Primary Examiner* — Brieann R Fink
(74) *Attorney, Agent, or Firm* — Armstrong Teasdale, LLP

(57) ABSTRACT

A polymer blend composition, in an exemplary embodiment, includes an impact modified polypropylene copolymer, and a low density polyethylene polymer. The ratio of an amount, by weight, of the impact modified polypropylene copolymer to an amount, by weight, of the low density polyethylene polymer is between about 6:4 to about 9:1.

14 Claims, No Drawings

(56) References Cited

U.S. PATENT DOCUMENTS

| | | |
|---|---|---|
| 2003/0069362 A1 | 4/2003 | Ramanathan et al. |
| 2003/0083437 A1 | 5/2003 | Bugada et al. |
| 2003/0114623 A1* | 6/2003 | Mitani et al. ................ 526/352 |
| 2003/0197302 A1 | 10/2003 | Kakarala et al. |
| 2003/0199637 A1 | 10/2003 | Kakarala et al. |
| 2003/0236334 A1 | 12/2003 | Gatewood et al. |
| 2004/0014891 A1* | 1/2004 | Krabbenborg et al. ....... 525/191 |
| 2004/0034167 A1 | 2/2004 | Shardl et al. |
| 2004/0072005 A1 | 4/2004 | German et al. |
| 2004/0087723 A1 | 5/2004 | Williams et al. |
| 2004/0152842 A1 | 8/2004 | Dunaway |
| 2005/0222339 A1 | 10/2005 | Gatewood et al. |
| 2005/0256270 A1 | 11/2005 | Weeks |
| 2005/0267261 A1 | 12/2005 | Player |
| 2006/0142495 A1 | 6/2006 | Lalho et al. |
| 2007/0037913 A1 | 2/2007 | Heck |
| 2007/0135580 A1* | 6/2007 | Tirelli et al. .................. 525/240 |
| 2007/0167575 A1 | 7/2007 | Weaver et al. |
| 2007/0203300 A1 | 8/2007 | Sumi et al. |
| 2007/0270551 A1 | 11/2007 | Bodiford et al. |
| 2008/0114130 A1 | 5/2008 | Ashbaugh et al. |
| 2008/0220273 A1* | 9/2008 | Weaver ......................... 428/480 |
| 2009/0156749 A1* | 6/2009 | Nummila-Pakarinen et al. ............................ 525/240 |

* cited by examiner

POLYMER BLEND COMPOSITION FOR AUTOMOTIVE FLOORING APPLICATIONS

BACKGROUND OF THE INVENTION

The field of the invention relates generally to a polymer blend composition, and more particularly to a polymer blend composition containing an impact modified polypropylene and a low density polyethylene that can be used to manufacture a non-carpeted automotive flooring material.

Automobile manufactures require that non-carpeted flooring material have scratch and mar resistance, low gloss, and grain definition, while being colorable, durable, and able to withstand large temperature changes without failure. In addition, automobile manufactures require that the flooring material has a low modulus (elasticity) for ease of installation into a vehicle.

Known non-carpeted flooring material are manufactured from blends of impact modified polypropylene and high melt strength polypropylene (partially crosslinked). The impact modified polypropylene creates flexibility to facilitate installation into a vehicle and contributes to low gloss, while the high melt strength polypropylene facilitates scratch and mar resistance, and provides adequate strength during a thermoforming process. However, these known flooring materials have a narrow window of temperature range for thermoforming. High crystallinity of the material leads to sharp drop-off in melt strength during the thermoforming process. In addition, these known flooring materials also significantly increase in gloss as forming temperatures are increased which does not meet automobile manufactures requirements.

BRIEF DESCRIPTION OF THE INVENTION

In one aspect, a polymer blend composition is provided. The polymer blend includes an impact modified polypropylene copolymer, and a low density polyethylene polymer. The ratio of an amount, by weight, of the impact modified polypropylene copolymer to an amount, by weight, of the low density polyethylene polymer is between about 6:4 to about 9:1.

In another aspect, a sheet of automotive flooring material is provided. The sheet of automotive flooring material is made from a polymeric material. The polymeric material is formed from a polymer blend composition. The polymer blend includes an impact modified polypropylene copolymer, and a low density polyethylene polymer. A ratio of an amount, by weight, of the impact modified polypropylene copolymer to an amount, by weight, of the low density polyethylene polymer is between about 6:4 to about 9:1.

In another aspect, a method of making an automotive flooring article is provided. The method includes providing a polymer blend composition, heating the polymer blend to a temperature of about 340° F. to about 380° F., extruding the heated polymer blend to form a sheet of automotive flooring material, and cooling the sheet of automotive flooring material. The polymer blend includes an impact modified polypropylene copolymer, and a low density polyethylene polymer. A ratio of an amount, by weight, of the impact modified polypropylene copolymer to an amount, by weight, of the low density polyethylene polymer is between about 6:4 to about 9:1.

DETAILED DESCRIPTION OF THE INVENTION

A polymer blend composition, an automotive flooring article, and a method of making the automotive flooring article is described below in detail. The polymer blend composition includes an impact modified polypropylene and a low density polyethylene that can be compounded into pellets or converted into sheet material. Sheets made with this blend are thermoformable, colorable, have low modulus elasticity, and low-gloss. The sheets can be grain embossed during the sheet manufacture or the grain can be added during a thermoforming process. The polymer blend composition is used in making non-carpeted automotive flooring articles, for example automotive flooring sheets. In addition, the polymer blend permits recycled blend material to be added back into the blend. Recycled concentrations up to about 50% can be used in the polymer blend and still maintain all the aesthetics and physical properties of the flooring article made from a polymer blend without recycled material. Surprisingly, automotive flooring articles made from the polymer blend maintains low gloss after thermoforming, have excellent hot strength in thermoforming, has low-temp flexibility (down to about −30° F.) and can utilize up to about 50% recycled blend material without adversely affecting the aesthetics or physical properties of the flooring articles.

In an exemplary embodiment, an automotive flooring article is formed from a polymer blend composition that includes an impact modified polypropylene and a highly branched low density polyethylene. A ratio of an amount, by weight, of the impact modified polypropylene copolymer to an amount, by weight, of the low density polyethylene polymer is between about 6:4 to about 9:1, and in another embodiment, between about 7:3 to about 8:2. The polymer blend composition may also include up to about 15 percent by weight of a mineral filler, the percent by weight based on the total weight of the composition. Suitable mineral fillers include, for example, limestone and barites. In one embodiment, the mineral filler is ground to a 325 Mesh. In other embodiments, higher or lower Mesh grinds can be used.

It should be understood that as used herein, "formed from" denotes open, e.g., "comprising", claim language. As such, it is intended that a composition "formed from" a list of components be a composition that includes at least these recited components, and can further include other, non-recited components, during the composition's formation, for example, UV absorbers; surfactants; processing aids, for example, calcium stearate; pigments, for example, carbon black; antioxidant stabilizers, for example, Irganox B225, commercially available from Ciba Geigy; and the like.

The impact modified polypropylene copolymer is a polypropylene modified with an EPDM rubber, a styrene butadiene rubber or an isoprene rubber. In particular, the impact modified polypropylene copolymer is formed from a propylene monomer and a ethylene propylene diene monomer (EPDM), a styrene butadiene monomer, or an isoprene monomer.

The impact modified polypropylene copolymer has a melt flow index measured at 230° C. of about 0.1 g/10 min to about 10 g/10 min. The low density polyethylene polymer has a melt flow index measured at 190° C. of about 0.1 g/10 min to about 10 g/10 min.

The automotive flooring article, for example, a non-carpet floor liner, a trunk liner, and floor mats, are formed by mixing the ingredients of the polymer blend composition. Specifically, in an exemplary embodiment, an impact modified polypropylene copolymer, a low density polyethylene, a mineral filler, an antioxidant stabilizer, a processing aid, for example calcium stearate, and carbon black are mixed together at a temperature of about 340° F. to about 380° F. The blended polymer composition is then extruded through an extruder having a steam jacket temperature of about 310° F., and the composition is extruded through a die at a temperature of about 380° F. to about 410° F. to form a sheet of flooring material. The extruded sheet material is passed through opposing calender rolls to adjust the thickness of the extruded sheet material to between about 1 mm to about 5 mm. Optionally the extruded sheet material can be embossed at about 800 psi to about 1000 psi at a sheet temperature of about 300° 1 to about 340° F. In another embodiment, the flooring sheet can be embossed during a thermoforming process. After the flooring sheet has been calendered and optionally embossed, the flooring material is cooled with air and/or water, and trimmed to size. The flooring material can be cut into individual sheets or rolled into a continuous roll of flooring material. The flooring material trimmed off the sheet can be recycled by regrinding the material, and adding the reground material to the polymer blend composition up to about 50 percent by weight of the polymer blend composition.

To form a finished flooring article, the flooring material is heated to about 320° F. to about 360° F. and then the hot sheet is placed in a mold mechanically or by hand. The hot sheet is then thermoformed by any suitable thermoforming process, for example, vacuum forming, thermo-stamping, and compression molding. In one embodiment, the mold surfaces have an embossing pattern etched into the surface to emboss the flooring material during the thermoforming process. The thermoformed flooring article is cooled and cut to size. The material trimmed from the flooring article can be reground and recycled by adding the reground flooring material to the polymer blend composition. The polymer blend composition can include up to about 50% of recycled material without any degradation to the properties of the resultant flooring article as compared to a flooring article made from a virgin polymer blend composition. In addition, the flooring material has a gloss of about 8 or less both before and after thermoforming. If the flooring material is embossed, the gloss is about 3 or less before and after thermoforming. Gloss is measured at a 60° angle using any known gloss meter, for example, a Nova-Gloss meter manufactured by Gretag-MacBeth Corporation.

The polymer blend composition will be further described by reference to the following examples which are presented for the purpose of illustration only. Unless otherwise indicated, all amounts are listed as parts by weight.

EXAMPLES

Two different formulations of the polymer blend compositions described above were compared to a control formulation containing an impact modified polypropylene copolymer. Table I below shows the formulations of Examples I, II, and III. Examples I and II are examples of the polymer blend compositions described above. Example III is a comparison example of a formulation that includes an impact modified polypropylene.

TABLE I

| Formulation | I | II | III |
|---|---|---|---|
| Impact Modified Polypropylene[1] | 75 | 72 | 100 |
| LDPE[2] | 25 | 23 | 0 |
| Limestone (325 Mesh) | 0 | 5 | 0 |
| Carbon Black | 2 | 2 | 2 |
| Antioxidant[3] | 0.5 | 0.5 | 0.5 |
| Calcium Stearate | 0.2 | 0.2 | 0.2 |

[1]Hifax CA10A, an impact modified polypropylene commercially available from Lyondell-Basell, Inc.
[2]ATEVA 505 LDPE, commercially available from AT Plastics, Inc., Edmonton, Alberta, Canada.
[3]Irganox B255, commercially available from Ciba Geigy Corporation.

Each of the formulations of Examples I, II, and III were extruded through an extruder having a steam jacket temperature of about 310° F., and then extruded through a die at a temperature of about 360° F. to form a sheet of flooring material. Half of the sheets of flooring material formed from each of the formulations of Examples I, II, and III were embossed, and the other half of the sheets were left unembossed. The gloss of each sheet was measured at 60° with a Nova-Gloss meter manufactured by Gretag-MacBeth Corporation. The sheets of flooring material were then thermoformed by heating the sheets to about 330° F. and then each hot sheet was placed in a mold, vacuum formed, and then cooled. The gloss of each sheet was again measured at 60°. Table II below shows the average gloss readings for each formulation of Examples I, II, and III.

TABLE II

|  | GLOSS at 60° | | |
|---|---|---|---|
|  | I | II | III |
| Extruded Sheet | | | |
| Embossed | 1.5 | 1.2 | 1.3 |
| Unembossed | 2.2 | 1.9 | 9.5 |
| Thermoformed Sheet | | | |
| Embossed | 1.7 | 1.5 | 10.1 |
| Unembossed | 2.4 | 2.1 | 29.0 |

Examples I and II exhibited a 60° gloss of less than 8 on unembossed sheets, and a 60° gloss of less than 3 on embossed sheets before and after thermoforming. Comparison Example III exhibited a large increase in gloss after thermoforming. Specifically, the 60° gloss of embossed sheets increased from 1.3 before thermoforming to 10.1 after thermoforming. In addition, the 60° gloss of unembossed sheets increased from 9.5 before thermoforming to 29.0 after thermoforming.

The automotive flooring articles made from the polymer blend compositions described above maintain low gloss after thermoforming, have excellent hot strength in thermoforming, has low-temp flexibility (down to about −30° F.) and can utilize up to about 50% recycled blend material without adversely affecting the aesthetics or physical properties of the automotive flooring articles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sheet of automotive flooring material consisting essentially of a polymer blend composition consisting essentially of:
   an impact modified propylene ethylene copolymer;
   a low density polyethylene polymer;
   optionally, mineral filler;
   optionally, pigment;
   optionally, antioxidant stabilizer;
   optionally, processing aid; and optionally, reclaimed automotive flooring material trimmed from a sheet of automotive flooring material consisting essentially of said impact modified propylene ethylene copolymer, low density polyethylene polymer and optional components;

wherein a ratio of an amount, by weight, of said impact modified polypropylene copolymer to an amount, by weight, of said low density polyethylene polymer is between about 7:3 and about 8:2;

wherein said sheet of automotive flooring material is thermoformed and optionally is embossed; and wherein said sheet of automotive flooring material, after being thermoformed, has a gloss equal to or less than 8 measured at a 60 degree angle if unembossed, and has a gloss equal to or less than 3 measured at a 60 degree angle if embossed.

2. A sheet of automotive flooring material in accordance with claim 1 wherein said mineral filler is present up to about 15 percent by weight based on the total weight of the composition.

3. A sheet of automotive flooring material in accordance with claim 2 wherein said mineral filler comprises at least one of limestone and barites.

4. A sheet of automotive flooring material in accordance with claim 2 wherein said reclaimed automotive flooring material is present up to about 50 percent by weight based on the total weight of said polymer blend composition.

5. A sheet of automotive flooring material in accordance with claim 2 wherein said impact modified polypropylene copolymer has a melt flow index at 230° C. of about 0.1 g/10 min to about 10 g/10 min, and said low density polyethylene polymer has a melt flow index at 190° C. of about 0.1 g/10 min to about 10 g/10 min.

6. A sheet of automotive flooring material consisting essentially of a polymer blend composition consisting essentially of:

an impact modified propylene ethylene copolymer;

a low density polyethylene polymer, said blend comprising about 70 percent by weight to about 80 percent by weight of said copolymer and about 20 percent by weight to about 30 percent by weight of said low density polyethylene polymer;

up to about 15 percent by weight of a mineral filler, the percent by weight based on the total weight of the polymer blend composition; and optionally, pigment;

optionally, antioxidant stabilizer;

optionally, processing aid; and optionally, reclaimed automotive flooring material trimmed from a sheet of automotive flooring material consisting essentially of said impact modified propylene ethylene copolymer, low density polyethylene polymer and optional components;

wherein said sheet of automotive flooring material is thermoformed and optionally is embossed; and wherein said sheet of automotive flooring material, after being thermoformed, has a gloss equal to or less than 8 measured at a 60 degree angle if unembossed, and has a gloss equal to or less than 3 measured at a 60 degree angle if embossed.

7. A sheet of automotive flooring material in accordance with claim 6 wherein said mineral filler comprises at least one of limestone and barites.

8. A sheet of automotive flooring material in accordance with claim 6 wherein said reclaimed automotive flooring material is present up to about 50 percent by weight based on the total weight of said polymer blend composition.

9. A sheet of automotive flooring material in accordance with claim 6 wherein said copolymer has a melt flow index at 230° C. of about 0.1 g/10 min to about 10 g/10 min, and said low density polyethylene polymer has a melt flow index at 190° C. of about 0.1 g/10 min to about 10 g/10 min.

10. A sheet of automotive flooring material consisting essentially of:

from about 70 to about 80 percent by weight of an impact modified polypropylene copolymer comprising a copolymer formed from a polypropylene modified with a polymer selected from the group consisting of an ethylene propylene diene monomer rubber, a styrene butadiene rubber or an isoprene rubber;

from about 20 to about 30 percent by weight of a low density polyethylene polymer;

optionally, mineral filler;

optionally, pigment;

optionally, antioxidant stabilizer;

optionally, processing aid; and optionally, reclaimed automotive flooring material trimmed from a sheet of automotive flooring material consisting essentially of said impact modified propylene ethylene copolymer, low density polyethylene polymer and optional components;

wherein said sheet of automotive flooring material is thermoformed and optionally is embossed; and wherein said sheet of automotive flooring material, after being thermoformed, has a gloss equal to or less than 8 measured at a 60 degree angle if unembossed, and has a gloss equal to or less than 3 measured at a 60 degree angle if embossed.

11. A sheet of automotive flooring material in accordance with claim 10 wherein said mineral filler is present up to about 15 percent by weight based on the total weight of the composition.

12. A sheet of automotive flooring material in accordance with claim 10 wherein said mineral filler comprises at least one of limestone and barites.

13. A sheet of automotive flooring material in accordance with claim 10 wherein said reclaimed automotive flooring material is present up to about 50 percent by weight based on the total weight of said polymer blend composition.

14. A sheet of automotive flooring material in accordance with claim 10 wherein said impact modified polypropylene copolymer has a melt flow index at 230° C. of about 0.1 g/10 min to about 10 g/10 min.

* * * * *